United States Patent

[11] 3,572,019

| [72] | Inventors | Josef Glunk;<br>Eike Gusewell, Gottmadingen, Germany |
|---|---|---|
| [21] | Appl. No. | 824,405 |
| [22] | Filed | May 14, 1969 |
| [45] | Patented | Mar. 23, 1971 |
| [73] | Assignee | Maschinenfabrik Fahr A. G.<br>Gottmadingen, Germany |
| [32] | Priority | May 16, 1968 |
| [33] | | Germany |
| [31] | | P 17 57 497.9 |

[54] ROTARY MOWER WITH DEFLECTING PLATE FOR WINDROW FORMATION
11 Claims, 4 Drawing Figs.

| [52] | U.S. Cl. | 56/192 |
|---|---|---|
| [51] | Int. Cl. | A01d 57/26 |
| [50] | Field of Search | 56/6, 25.4, 192, 370, 372 |

[56] References Cited
UNITED STATES PATENTS

| 903,742 | 11/1908 | Loving | 56/314 |
|---|---|---|---|
| 3,105,341 | 10/1963 | Crump | 56/192 |
| 3,391,522 | 7/1968 | Zweegers | 56/6 |

*Primary Examiner*—Russell R. Kinsey
*Attorney*—Karl F. Ross

ABSTRACT: A rotary mower has at least two mower assemblies each with a vertical cylindrical drum bearing at its lower end a plurality of outwardly projecting blades. These drums are mounted below a support beam and rotated in opposite directions about their axes so as to cut a standing crop and then project it back between them. A deflecting plate is mounted behind at least one of the assemblies on the support and has a bent over forward edge which lies immediately adjacent to the body and the blade orbit and extends counter to the sense of rotation of the mower. This plate can pivot upwardly freely to prevent blockages and is inclined to the direction of travel of the mower to form a windrow from the rearwardly cast crop material.

INVENTORS
JOSEF GLUNK
EIKE GÜSEWELL
BY Karl J. Ross

ATTORNEY

FIG. 3
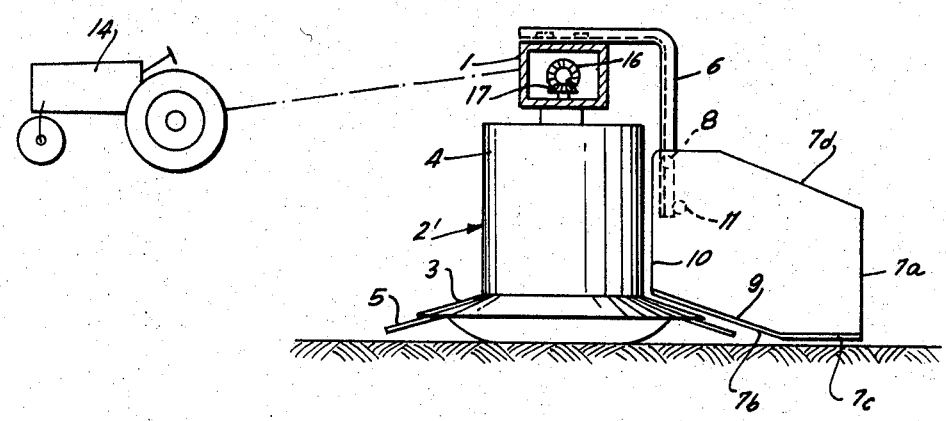
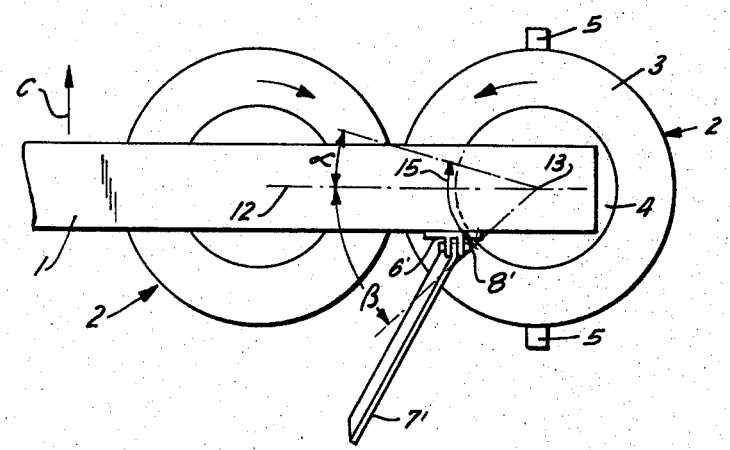
FIG. 4
INVENTORS
JOSEF GLUNK
EIKE GÜSEWELL
BY
Karl F. Ross
ATTORNEY

ROTARY MOWER WITH DEFLECTING PLATE FOR WINDROW FORMATION

The present invention relates to a rotary mower, and, more particularly, to a rotary mower with a plurality of mower assemblies mounted on a common support beam adapted to be displaced by a farm vehicle, such as a tractor.

Generally speaking, mower assemblies may be provided which each have a cylindrical drum on whose bottom end is mounted an outwardly diverging frustoconical skirt or blade plate which in turn carries several angularly equispaced, outwardly projecting blades.

Several such assemblies—usually an even number—are mounted next to one another on a common support beam to extend athwart the path of the prime mover and cut a swath.

Each assembly along the beam turns in a sense opposite to that of its neighboring assemblies such that the cut crop is cast rearwardly as many windrows between pairs of mover assemblies. It has been proposed to provide such mowers, a deflecting plate in back of at least the laterally outwardmost mower assembles to form the windrow of desired width. Such plates, analogous to swath plates or blades of sickle bars and the like, are generally upright and located at a spacing of sizable proportions behind the assemblies to prevent hay, alfalfa, or other crop material from building up against this plate.

However, in spite of this precaution, such buildups inevitably form. Clearing them requires a complete halt of the mowing operation while the operator manually frees of the plate.

Furthermore, heavy objects, such as rocks or pieces of wood, cast by the blades, or over which the assemblies ride, often badly damage such plates making them useless as windrow formers.

It is, therefore, the general object of the present invention to provide an improved rotary mower with a crop deflecting plate or blade.

More specifically, an object of my invention is to provide a rotary mower having at least one deflecting plate which does not permit the buildup of the mowed crop in front of it.

Another object is to provide such a deflecting plate which is not readily damaged by hard objects thrown by the mower assembly.

Yet another object is to provide a rotary mower having a deflecting plate arrangement which is particularly efficacious while still being inexpensive and simple to manufacture.

The above objects are attained, in accordance with the principal features of the present invention, by a mowing assembly of the above-mentioned type which has at least one deflecting plate whose leading or forward edge is spaced immediately behind or next to the drum and the blade of at least the outermost mower assemblies and which is generally vertical while being inclined inwardly and rearwardly with respect to the direction of travel. A particular feature of the invention is that the plate is pivotal about an axis transverse to the direction of travel to allow it to tip up should a jam start to build up in front of it. Thus we provide a horizontal support for a member of mower assemblies and a crop deflecting plate behind the laterally outermost assemblies having its leading edge parallel to and closely spaced from a generatrix of the cylindrical and frustoconical members of the mower assembly.

According to a further feature of the invention, this deflecting plate is mounted on an arm fixed to the support beam of the mower. This arm is springy enough to permit the plate to bend up and/or to the side should it be forcefully hit by a stone or other solid object.

In order that the above-described deflecting plate most effectively can strip mower crop off the rotating guide drum and blade, it is formed, according to another feature of the invention with a bent over edge or flange which extends tangentially to the body and blades and is directed into the direction of rotation, i.e. counter to the rotational sense. Where the mower assembly has a frustoconical skirt diverging downwardly and outwardly from the drum, this flange may be provided only parallel to the skirt.

Yet another feature of the present invention concerns the placement of the deflecting plate. It has been found to be advantageous to incline it at around 30° to the direction of travel, with the trailing edge inward of the leading edge on the mower. Both the leading and trailing edges of the plate are vertical, i.e. parallel to one another, while the upper plate edge may be inclined downwardly and rearwardly so to parallel the bottom edge. A further advantage is gained if the leading edge, which is closest to the drum and blade is positioned along a circular arc of around 60° centered on the axis of rotation of the respective assembly. This arc starts about 15° ahead of the horizontal longitudinal axis of the beam support and ends around 45° behind it, thus consists of slightly less than the lower left quadrant, viewing the mower from above and behind. Such a positioning gives rise to windrows of excellent shape. In general, therefore, the right and left outermost mower units will rotate counterclockwise and clockwise, respectively when viewed from the top, and have windrow shaping boards lying along respective secants extending rearwardly and inwardly at the second quadrants of the rotation of the mowers. The windrow plates are vertical and generally are of parallelogrammatic configurations.

The above and other objects, features and advantages will become more readily apparent from the following description, reference being made to the drawing in which:

FIG. 3 is an enlarged section taken along line III—III of FIG. 2; and

FIG. 4 is a view similar to that of FIG. 2 of an alternate embodiment of the present invention.

Figure 1:
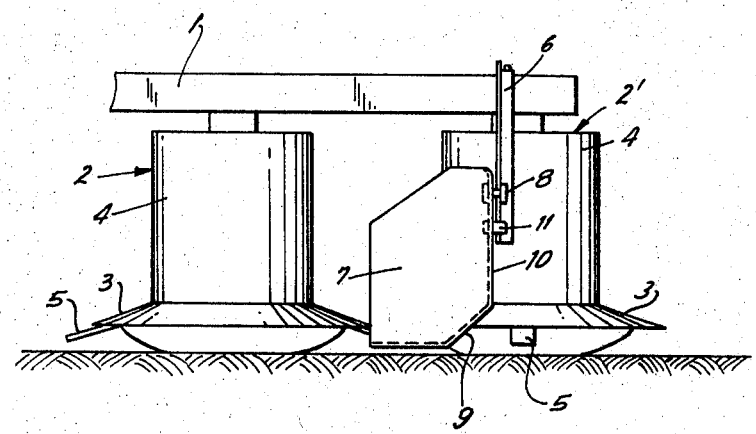
FIG. 1 is a rear perspective view of two mowing assemblies mounted on a common support beam according to the present invention.
Figure 2:
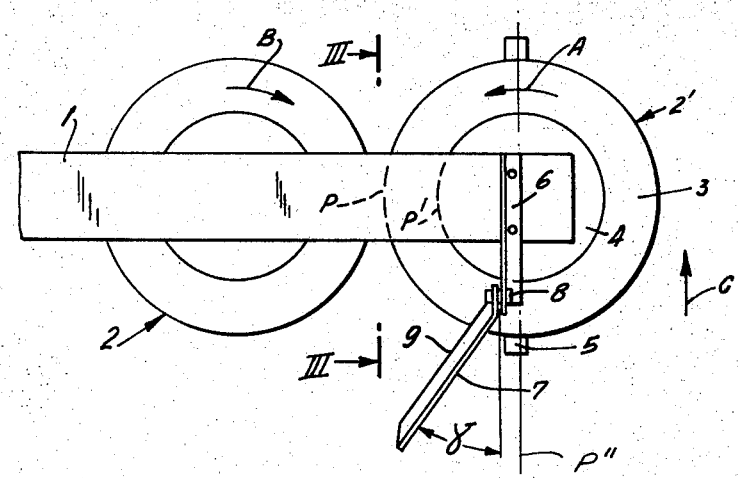
FIG. 2 is a top view of the assemblies and support shown in FIG. 1.

As shown in FIGS. 1—3, a horizontal support beam 1 supports two mower assemblies 2 and 2'. This beam 1 is attached to a tractor 14 (FIG. 3) by conventional hitch means. Generally speaking, four, six or more such assemblies are mounted on a single beam for forming two, three or more windrows. The assemblies 2 and 2' are driven in opposite senses as shown by arrows A and B by the tractor power takeoff through level gears as shown at 16 and 17 in FIG. 3. The entire mower is drawn in the direction of an arrow C (FIG. 2).

Each assembly 2 or 2' consists of an upright cylindrical drum 4 with a frustoconical skirt 3 below it mounting two blades 5 each. The blades 5 of neighboring assemblies are offset angularly by 90° so that their orbits will overlap without them striking each other.

An arm 6 of right-angle cross section extends out behind the support 1 above the outermost mower assembly 2' and bends down to where it mounts a deflecting plate 7 by means of a bolt 8 extending horizontally transverse to the direction C. The plate 7 can pivot up about the bolt 8 and is bent inward by an angle γ of 30° to deflect cut crop inward. A leading edge 10 closely conforms to the shape of the drum 4, the skirt 3, and the blades 5, offering a clearance of a fraction of an inch between them. The lower end of the plate 7 is bent to form a flange 9 which extends tangentially into the sense A of rotation of the assembly 2'. A pin 11 welded to the plate 7 abuts the end of the arm 6 and prevents the plate 5 from pivoting into contact with the drum 4, thereby serving as stop means for this plate.

In general, the plate 7 (also plate 7' described hereinafter) can be said to be substantially planar and to lie in a vertical plane transverse to the beam 1 and, moreover, inclined rearwardly and inwardly from this beam at an angle γ with the direction of travel ranging from 15° to 45°, preferably about 30°. The trailing edge 7a of the plate or blade is vertical, i.e. parallel to the leading edge 10 and of identical length, while lying inwardly, with respect to the swath cut by the mower, of the innermost point P of the frustoconical skirt 3 of the outermost mower assembly. The leading edge 10, however, lies outwardly of the innermost point P' of the cylindrical drum 4 and preferably between the latter point and the diametral plane P– of the mower assembly in the direction of travel of the mower. The lower edge 7b of the plate 7 lies parallel to a generatrix of the skirt 3, but extends downwardly therebeyond to parallel the blades 5 until it reaches close to the ground surface, whence it runs horizontally along a stretch 7c. The edges 7b and 7c are provided with the right-angle flanges 9 turned into the direction of rotation of the drum. The leading edge 10 is closely juxtaposed with the drum 4 and is parallel to a generatrix thereof, the drum having the same diameter as the inner diameter of the frustoconical skirt 3. The upper edge 7d of the plate 7 is parallel to edge 7b to impart a generally parallelogrammatic configuration to the plate.

Thus, a standing crop is cut by the blades 5 and then guided back behind the mower by the drums 4. Thence it strikes the plate 7 and is deflected into a windrow. Buildup of crop between the plate 7 and the drum 4 is virtually excluded due to the close proximity of the two. At the same time, should some jam start there, or some body get caught between the two, the plate 7 will swing up about the bolt 8 thereby freeing itself, and will swing immediately back to resume its normal function with virtually no hiatus in the mowing operation. In addition, the arm 6 is somewhat flexible so that, should the plate 7 be stressed in any direction other than the front-to-back one, it will bend momentarily and come back into place once the force no longer is present.

FIG. 4 shows a different embodiment wherein similar reference numerals are used for parts identical to those in FIGS. 1—3. Here a deflecting plate 7' is mounted via a bolt 8' on a bracket 6' on the beam 1. This plate 7' is mounted much further inboard than the plate 7 of FIGS. 1—3. It most closely approaches the drum 4 here at a location along a circular arc 15 centered on an axis 13 of rotation of that drum 4. This arc 15 starts at an angle α of 15° in front of a longitudinal axis 12 of the beam 1 and an angle β of 45° behind this axis 12. With such a positioning of the plate 7', the cut crop is deflected a good distance away from the crop left standing, thereby making subsequent mowing easier. Once again, this plate 7' is pivotal about an axis determined by a mounting pin 8' but is here prevented from contacting the drum 4 by contact of its leading edge with the rear side of the beam 1.

We claim:
1. A rotary mower comprising:
   a support displaceable in a horizontal direction;
   at least one rotatable upright body of revolution journaled in said support below same;
   at least one blade below and attached to said body, said blade describing an orbit on rotation of said body;
   means for rotating said body and said blade in one sense about the axis of said body; and
   an upright deflecting plate pivotal on said support about a horizontal axis generally transverse to said direction, said plate having a forward edge immediately adjacent and conforming to said body and said orbit of said blade, whereby a standing crop is cup by said blade, guided by said body behind said support, and deflected into a windrow by said plate.

2. The mower defined in claim 1 wherein said support is elongated and extends horizontally transverse to said direction, said mower further comprising another such body and blade mounted below said support adjacent said one body and blade, said means rotating said other body and blade about the axis of said other body in a rotational sense opposite to said one sense, the axis of said bodies being parallel.

3. The mower defined in claim 2 wherein said bodies have a cylindrical upper portion and a downwardly diverging frustoconical lower portion, said lower portion mounting said blade.

4. The mower defined in claim 1 wherein said edge is formed with a transverse flange extending tangential to said body and orbit and into said sense of rotation.

5. The mower defined in claim 1 further comprising stop means on said plate and said support for holding said edge out of contact with said blade and body.

6. The mower defined in claim 5 wherein said support has an arm, said plate pivoting on said arm.

7. The mower defined in claim 6 wherein said arm is flexible.

8. The mower defined in claim 6 wherein said plate is formed with a projection engageable with said arm below said other axis, said arm and said projection thereby forming said stop means.

9. The mower defined in claim 1 wherein said plate is inclined into said one sense of rotation of said body at an angle of substantially 30° to said direction of travel.

10. The mower defined in claim 1 wherein said plate is pivoted at a location adjacent said body lying on a circular arc of substantially 60° centered on said axis of rotation of said body and starting 15° in front of a line perpendicular to said direction and ending 45° behind said line.

11. A rotary mower as defined in claim 1, wherein said support is a beam pivot provided with a plurality of mower assemblies horizontally spaced along said beam transversely to the direction of displacement thereof, said mower assemblies each including one of said rotatable bodies and a respective one of said blades therebelow, said plate being mounted on said support adjacent the laterally outermost of said assemblies with respect to the direction of displacement of said beam and and being inclined inwardly and rearwardly at an angle ranging from 15° to 45° to the latter direction, each of said bodies including a cylindrical drum and a downwardly diverging frustoconical skirt extending outwardly below the respective drum and carrying the respective blade below the skirt, said plate having a leading edge lying parallel to a generatrix of the drum of said outermost mower assembly between a diametral plane thereof parallel to the direction of displacement of said beam and the innermost point of said drum of said outermost assembly with respect to the swath out by the mower, a lower edge parallel to a generatrix of said skirt and extending therebeyond close to the ground surface, an upper edge parallel to said lower edge, and a trailing edge lying inwardly of the innermost point of said skirt of said outermost mower assembly; said mower further comprising mounting means pivotally connecting said plate at an upper portion thereof adjacent said leading edge to said beam for free-swinging vertical movement about an axis parallel to said beam and perpendicular to the direction of displacement thereof, and a stop on said plate engageable with said mounting means for retaining said leading and said lower edges out of engagement with the drum and skirt of said outermost mower assembly, respectively.